2,809,938

ACTIVATABLE CHARS, ACTIVATED CARBONS, AND PROCESS FOR PREPARING THE SAME

Mayer B. Goren and Ira D. Elkins, Oklahoma City, Okla., assignors to Kerr-McGee Oil Industries, Inc., a corporation of Delaware No Drawing. Application May 26, 1954,
Serial No. 432,619

8 Claims. (Cl. 252—422)

This invention relates to activatable chars and activated carbons prepared from asphalt-type bituminous materials. More particularly, the present invention relates to new and useful products which are activatable chars and activated carbons and to the method of producing these products in which primary carbonization and subsequent activation are obtained without the difficulties generally encountered when employing prior art techniques for treating such materials.

By the terms "asphalt(s)" or "asphalt-type bituminous materials" as used herein including the claims is meant pyrogenous asphalts such as vacuum reduced asphalt and naturally occurring asphalts (bitumens and pyrobitumens), one or more fractions or components thereof, or products obtained by blowing these materials or one or more of their components or fractions with air or an oxygen containing gas in the presence or absence of catalysts. Examples of such materials include gilsonite, grahamite, wurtzilite, albertite, elaterite, native asphalts, such as Trinidad asphalts, etc. Blown asphalt-type bituminous materials include those blown with air or an oxygen containing gas either in the presence or absence of catalysts, such as phosphorous pentoxide, ferric chloride, cobaltic salts, etc. By the term "components" or "fractions" of asphalt-type bituminous materials is meant asphaltenes, resin and oil mixtures, and separate resin and oil fractions. These may be obtained, for example, by the method described in copending application Serial No. 218,480, filed March 30, 1951, now U. S. Patent No. 2,783,188.

Materials falling into the general category described above, and in general characterized by high volatile content will loose a considerable amount of weight during carbonization. In addition, further losses will be encountered in the subsequent activation step. As a result of these losses the over-all yield of activated carbon obtained from these materials in accordance with the prior art methods has been very low. In addition, during the course of the carbonization most of the above described materials undergo fusion to a greater or lesser extent, with attendant bubbling during the expulsion of gaseous degradation products and as a consequence, formation of macropores that give rise to friable materials of poor mechanical strength. Such products, as a result, require pelletization with binders and recarbonization prior to activation in order that they may have sufficient mechanical strength to be useful, for example, as gas adsorbents.

Because of the characteristics of low over-all yield and poor mechanical strength of these products, asphalt-type bituminous materials have heretofore been considered more suitable as binders for active carbon than as base materials. The conclusions of Morgan and Fink (Morgan, J. J., and Fink, C. E., Ind. Eng. Chem. 38, 219 (1946)) indicate that asphalt-type bituminous materials fall into the category of binders, i. e. substances which, during carbonization, melt, swell, and become macroporous as contrasted with base materials which usually shrink during loss of volatile matter or at least show no or a minimum of swelling. Inasmuch as binder materials carbonize to give (after activation) carbons of low activity, these investigators conclude that such substances are in the main not very desirable as raw materials for activated carbon.

Similar, though perhaps not as broad conclusions were reached by investigators at the Bureau of Mines (Fieldner, A. C.; Hall, R. E., and Galloway, A. E., Bur. Mines, Tech. Paper 279 (1930)), who found that certain bituminous and sub-bituminous coals, lignites, natural cokes, pitch coke and petroleum coke did not yield satisfactory adsorbent carbons by methods which, with desirable raw materials, were successful. These investigators likewise point out the desirability of achieving shrinkage of the base material during the carbonization step.

The suggestion is made by both groups of investigators that a binder material might be made more like a base material through prolonged heating at preplastic temperatures or by using a slow rate of heating (Morgan and Fink), or in the instances of some high-volatile materials, preliminary carbonization and powdering followed by briquetting and recarbonization. These suggested variations in the procedures for preparing active carbons from asphalt-type bituminous materials have been successfully applied to the problem, as evidenced by U. S. Patent 2,549,298 which describes long heating at preplastic temperatures and/or slow oxidation, in order to effect carbonization without concomitant fusion.

An object of the present invention is to produce new and improved activatable chars and activated carbons from asphalt-type bituminous materials.

A further object of the present invention is to provide an improved process for producing these products from asphalt-type bituminous materials.

These and other objects of the present invention will become more apparent from the following description.

In accordance with the present invention, we have discovered that asphalt-type bituminous materials which are normally placed in the binder category, may be converted into hard, granular, useful, essentially ash-free activatable chars by a series of steps involving sulfonation of the material in particulate form with concentrated sulfuric acid to obtain a product readily wet by water, removal of unreacted $SO_2$ by distillation at gradually increasing temperature, drying the resultant product at a temperature between 300 and 450° C. and subsequent charring of this product at elevated temperature in the absence of oxygen. The resulting activatable chars may be in turn activated by subjecting them to the action of carbon activating medium at temperatures above 800° C.

The first step in this process, namely treatment with concentrated sulfuric acid at elevated temperature requires the use of ½ to 9 parts by weight of concentrated sulfuric acid for each part by weight of asphalt-type bituminous material treated. Use of less than ½ part by weight of concentrated sulfuric acid for each part by weight of asphalt-type bituminous material will not obtain a product readily wet by water which is sulfonated to the point it is just infusible. On the other hand use of more than 9 parts by weight of concentrated sulfuric acid for each part by weight of asphalt-type bituminous material results in the presence of excess sulfuric acid which is not needed for the reaction and requires removal by a subsequent distillation step. The temperature for this treatment with concentrated sulfuric acid should be between 60 and 150° C., inclusive. At temperatures below 60° C. very little reaction occurs in a reasonable length of time. On the other hand, at temperatures above 150° C. during this sulfonation step, more charring than sulfonation takes place so that the product is inferior and furthermore the reaction becomes more difficult to moderate and control.

The step of gradual distillation which occurs between the initial sulfonation and heating to dryness at temperatures between 300 and 450° C. must be carried out by slowly raising the temperature of the reaction mixture. This step probably causes further sulfonation of the intermediate product of step one and results in the removal of excess acid.

In the step of heating the reaction mixture to dryness it is necessary that a temperature between 300 and 450° C. be employed. Lower temperatures do not remove all of the excess acid. On the other hand, higher temperatures cause contamination of the acid removed by organic pyrolysis products. Thus from the standpoint of reagents recovery, it is desirable to prevent the formation of these organic pyrolysis products which occurs at temperatures higher than 450° C.

The final charring step is, as will be understood by those skilled in the art, carried out at elevated temperature in the absence of oxygen. Temperatures in the neighborhood of 500° C. are necessary for this charring operation in order to evolve the volatile and combustible substances present. Small amounts of sulfur-containing gases can be recovered during this step but in general the yield of these gases is low since most of the sulfur introduced as sulfuric acid in the beginning of the process is recovered as useful sulfur dioxide in the first two stages of the process. The volatile gases evolved during carbonization are rich in carbonaceous material and capable of yielding valuable by-products. Additionally, they may be used as auxiliary fuel for the process.

The product of the foregoing step of sulfonation, distillation, heating to dryness, and subsequent charring is essentially of the same particle size as the original charge and consists of hard, dense, shiny particles. It may then be activated by the usual methods, such as heating to high temperatures (800–1200° C.) in a current of steam, flue gas, carbon dioxide, etc. As a result the final product is a hard granular activated carbon of high adsorption capacity, good physical stability, and one which is readily reactivated after exhaustion.

As will be demonstrated by the examples appearing hereinafter, the products resulting from the process of the present invention are obtained in excellent yield, are not macroporous and have excellent mechanical strength and physical stability with improved surface areas. The beneficial effects of the process of this invention are believed to be brought about by the concentrated sulfuric acid treatment which probably causes simultaneous oxidation and dehydrogenation with attended growth of molecular size as well as sulfonation or sulfation, all of which serve to eliminate subsequent fusion during charring and decrease the amount of volatile carbonaceous material given off during the charring process. Averting fusion results in structures which are not macroporous but instead have desirable tiny fractures in the carbon structure.

The following examples are for the purpose of illustrating the present invention and comparing the prior art processes with the processes of the present invention but are not limiting to the scope thereof.

*Example I*

A vacuum reduced asphalt was treated with ten volumes of pentane to precipitate asphaltenes, which were separated, dried, heated to fusion, cast, and ground. The material was screened and 20–40 mesh material retained for conversion into activated carbon. Fines were remelted, cast and reground.

A 200 g. charge of the asphaltene material was slowly coked in a retort with exclusion of air, allowing for the discharge of gases. Foaming, owing to fusion and evolution of gases, was severe, so that the rate of heating had to be carefully controlled to prevent mechanical loss of material. The final temperature of coking was 500° C., and heating was continued for about ten minutes after essentially all volatile material had been evolved. The residue weighed 104 g. It was crushed and screened; the 20–40 mesh fraction weighed 27 g. Then, 26 g. of this screened coke was activated in a current of superheated steam for thirty minutes at 975° C., a large excess of steam being employed. The activated product weighed 9.5 grams, giving an over-all yield of product based on asphaltenes of 4.8%.

The activated material was tested for $CCl_4$ service time as outlined by Chaney and Fielder (Ind. Eng. Chem. 11, 524, 1919) as modified by Stone and Clinton (Ind. Eng. Chem., Anal. Ed. 14, 131, 1942). Under the conditions outlined in this test the activated material prepared as above described had a $CCl_4$ service time of 36 seconds. Thus the activated asphaltene coke exhibited a bare minimum of activity and would be considered worthless as an active char.

*Example II*

100 g. of 20–40 mesh asphaltenes prepared as described in Example I was treated with 370 grams (200 ml.) of concentrated sulfuric acid in an apparatus mounted with a powerful stirrer and vented for the escape of gases. The mixture was slowly heated to water bath temperature (approximately 100° C.) and maintained for two hours. During the course of this reaction, large volumes of sulfur dioxide were evolved. The mixture was then cooled, washed with a large excess of water, dried at room temperature overnight and screened, 135 grams of 20–40 mesh material being obtained. Inasmuch as drying at ambient temperature leaves a considerable amount of moisture in the acid treated material, the weight of this product is not indicative of yield. Few fines are formed in this process, however.

100 g. of the dried material was carbonized by heating to 500° C. until no more volatile material escaped, affording as a residue 60 grams of coked product which showed only slight evidence of having undergone fusion during the carbonization. This product was digested with dilute sulfuric acid (during which considerable $H_2S$ was evolved), dried and steam activated as described in Example I, affording 43 g. of material. Tested in the same manner as was the material in Example I, the product had a $CCl_4$ service time of 500 seconds—a fourteen-fold increase in activity over that of the product of Example I.

*Example III*

100 g. of 20–40 mesh asphaltenes prepared as above described was treated with 200 ml. of concentrated sulfuric acid (370 g.) heated to water bath temperature and maintained for two hours. Heating was then continued until a final temperature of 400° C. was attained. Copious evolution of $SO_2$ attended the whole operation. The essentially dry product was then screened to eliminate the small amount of fines which had been produced. The 20–40 mesh fraction was coked by heating at 500° C. until evolution of gases had ceased, affording 77 g. of coked material. Half of the char was then activated with superheated steam at 800° C. for 35 min. affording 36 g. of activated carbon. This material had a $CCl_4$ service time of 185 seconds. The other half of the char was activated with superheated steam at 950° C. for 35 min. and yielded 24 g. of activated carbon. This material had a $CCl_4$ service time of 1028 seconds. It was regenerated by heating for 7 mins. at 975° C. in a current of superheated steam and exhibited a $CCl_4$ service time of 1050 sec.—a thirty-fold increase in activity over that of the product of Example I.

*Example IV*

A sample of gilsonite having a pressed powder ring and ball softening point of 325–330° F. was crushed and sieved to a mesh size of between 20 and 40. One hundred grams of the sieved material was treated with 200 ml. of concentrated sulfuric acid at 150° C. as described in Example III. Heating was then continued to a final temperature of 400° C. Carbonization was carried out as in previous examples followed by activation at 975° C. for 45 minutes. The product exhibited a CCl₄ service time of 710 seconds in the standard test.

*Example V*

100 g. of a crushed screened blown asphalt 263° F. softening point and penetration of 8 was treated with concentrated sulfuric acid (200 ml.) as in the previous examples. Heating to dryness, carbonization and activation followed under conditions identical to those of Example III. The activated material exhibited a CCl₄ service time of 619 seconds in the standard test.

We claim:

1. The process for making an activatable char from an asphalt which comprises the steps of heating asphalt in particulate form within the temperature range 60–150° C. and in the presence of ½ to 9 parts by weight of concentrated sulfuric acid for each part by weight of asphalt thereby sulfonating and obtaining a product readily wet by water, distilling off sulfur dioxide by gradually increasing the temperature of the reaction mixture, heating to dryness at a temperature between 300 and 450° C., and subsequently charring the product at elevated temperature in the absence of oxygen.

2. The process for making activated carbon from an asphalt which comprises the steps of heating asphalt in particulate form within the temperature range 60–150° C. and in the presence of ½ to 9 parts by weight of concentrated sulfuric acid for each part by weight of asphalt thereby sulfonating and obtaining a product readily wet by water, distilling off sulfur dioxide by gradually increasing the temperature of the reaction mixture, heating to dryness at a temperature between 300 and 450° C., subsequently charring the product at elevated temperature in the absence of oxygen and subjecting the resulting activatable char to the action of carbon activating medium at temperatures above 800° C.

3. The process for making an activatable char from asphaltenes which comprises the steps of heating asphaltenes in particulate form within the temperature range 60–150° C. and in the presence of ½ to 9 parts by weight of concentrated sulfuric acid for each part by weight of asphaltenes thereby sulfonating and obtaining a product readily wet by water, distilling off sulfur dioxide by gradually increasing the temperature of the reaction mixture, heating to dryness at a temperature between 300 and 450° C., and subsequently charring the product at elevated temperature in the absence of oxygen.

4. The process for making activated carbon from asphaltenes which comprises the steps of heating asphaltenes in particulate form within the temperature range 60–150° C. and in the presence of ½ to 9 parts by weight of concentrated sulfuric acid for each part by weight of asphaltenes thereby sulfonating and obtaining a product readily wet by water, distilling off sulfur dioxide by gradually increasing the temperature of the reaction mixture, heating to dryness at a temperature between 300 and 450° C., subsequently charring the product at elevated temperature in the absence of oxygen and subjecting the resulting activatable char to the action of carbon activating medium at temperatures above 800° C.

5. An activatable char produced in accordance with the process of claim 1.

6. An activated carbon as produced by the process of claim 2.

7. An activatable char as produced by the process of claim 3.

8. An activated carbon as produced by the process of claim 4.

References Cited in the file of this patent

UNITED STATES PATENTS

| | | |
|---|---|---|
| 2,201,050 | Oberle | May 14, 1940 |
| 2,585,454 | Gamson | Feb. 12, 1952 |